US009066215B2

(12) United States Patent
Herrero Vernon et al.

(10) Patent No.: US 9,066,215 B2
(45) Date of Patent: *Jun. 23, 2015

(54) SPEECH/MULTIMEDIA MODE SWITCHING TECHNIQUE IN A WIRELESS COMMUNICATIONS NETWORK

(71) Applicant: Unwired Planet, LLC, Reno, NV (US)

(72) Inventors: Christian Herrero Vernon, Lund (SE); Patrice Hede, Enghien-les-Bains (FR); John Kerr, Herzogenrath (DE)

(73) Assignee: Unwired Planet, LLC, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,573

(22) Filed: Apr. 15, 2013

(65) Prior Publication Data

US 2013/0231095 A1    Sep. 5, 2013

Related U.S. Application Data

(63) Continuation of application No. 11/814,523, filed as application No. PCT/EP2005/000924 on Jan. 31, 2005, now Pat. No. 8,422,998.

(51) Int. Cl.
*H04M 3/42* (2006.01)
*H04W 4/00* (2009.01)
(Continued)

(52) U.S. Cl.
CPC ........................................ *H04W 4/16* (2013.01)

(58) Field of Classification Search
CPC .............. H04L 29/06027; H04L 29/06; H04L 65/1069; H04L 69/24
USPC ........ 455/426.1, 434, 462, 464, 452.2, 414.1; 370/352–356

(56) References Cited

U.S. PATENT DOCUMENTS

2002/0077105 A1 *   6/2002   Chang ........................... 455/436
2003/0096627 A1 *   5/2003   Rasanen et al. ............... 455/466
(Continued)

FOREIGN PATENT DOCUMENTS

JP          08-130586 A       5/1996
JP          08130586  A   *   5/1996
(Continued)

OTHER PUBLICATIONS

3 GPP TS 24.008 V6.6.0 (Sep. 2004), 3$^{rd}$ Generation Partnership Project; Technical Specification Group Core Network, Mobile Radio Interface Layer 3 Specification, Core Network Protocols, Stage 3 (Rel. 6); Pub Sep. 2004.
(Continued)

*Primary Examiner* — Dung Hong
(74) *Attorney, Agent, or Firm* — Nixon & Vanderhye, P.C.

(57) ABSTRACT

A technique is provided for use by a user terminal or mobile services switching center (MSC) for responding to a request to switch an on-going call from speech mode to multimedia mode within a wireless communication network configured to automatically disconnect a call if a requested mode switch is not confirmed within a predetermined period of time specified by a call drop timer. In one example, the terminal or MSC activates an automatic response timer upon receipt of a request from a user to switch an on-going call from speech to multimedia, with the timer set shorter than the call drop timer. The user receiving the request is then prompted to accept or decline the request. If no response is received before expiration of the automatic response timer, the terminal or MSC automatically declines the request on behalf of the user so that the call drop timer does not expire.

19 Claims, 6 Drawing Sheets

(51) Int. Cl.
*H04L 29/08* (2006.01)
*H04L 12/66* (2006.01)
*H04N 7/14* (2006.01)
*H04W 4/16* (2009.01)

(56) References Cited

U.S. PATENT DOCUMENTS

2004/0048612 A1* 3/2004 Virtanen et al. ............ 455/426.1
2005/0064821 A1* 3/2005 Hedberg et al. ............ 455/67.11
2005/0180338 A1* 8/2005 Pirila et al. .................... 370/252

OTHER PUBLICATIONS

3GPP TS 23.172 V6.0.0, 3rd Generation Partnership Project; Technical Specification Group Core Network; "Technical Realization of Circuit Switched (CS) Multimedia Service UDI/RDI Fallback and Service Modification"; Stage 2 (Release 6) (Mar. 2004).

3GPP TS 26.111 V5.1.0, 3rd Generation Partnership Project; Technical Specification Group Services and System Aspects; "Codec for Circuit Switched Multimedia Telephony Service"; Modifications to H.324 (Release 5) (Jun. 2003).

* cited by examiner

FIG. 6

SPEECH/MULTIMEDIA MODE SWITCHING TECHNIQUE IN A WIRELESS COMMUNICATIONS NETWORK

This application is a continuation of U.S. patent application Ser. No. 11/814,523 filed Jul. 23, 2007, which is the National Phase of PCT/EP2005/00924 filed Jan. 31, 2005, the entire contents of each of which are hereby incorporated by reference.

DESCRIPTION

1. Field of the Invention

The invention generally relates to wireless communication networks and in particular to a technique for controlling switching between speech and multimedia modes within such networks.

2. Background of the Invention

State-of-art wireless communication networks provide the capability of handling voice communications as well as multimedia transmissions such as the transmission of photos, videos, music, and the like. Various protocols for incorporating multimedia into a wireless communication networks are specified by the 3rd Generation Partnership Project (3GPP), which is a joint standardization project of the various standardization bodies of Europe, Japan, Korea, USA and China. 3GPP protocols may be exploited, for example, within second generation wireless communication networks such as those configured in accordance with Global Network for Mobile Communications (GSM) standard, as well as in third generation networks such as those configured in accordance with the Universal Mobile Telecommunications Network (UMTS) standard.

Within early 3GPP protocols, such as 3G.324 of 3GPP R-99, only "pure" multimedia or pure speech calls could be set up. Users wishing to temporarily switch between speech and multimedia would thereby need to hang up and redial to switch modes. To address this problem, a new functionality (referred to as Service Change and Unrestricted Digital Interface (UDI) Fallback (SCUDIF) functionality) has been incorporated within more recent 3GPP protocols, such as 3GPP Rel-5. SCUDIF provides capability to fallback to a single service, i.e. either speech or multimedia, at call set up, as well as to switch services during the active phase of the call.

The fallback functionality allows calls being set-up as multimedia calls to fallback to speech calls if the network or terminating user equipment (e.g., the handset of the user receiving the call) does not accommodate multimedia. By providing a fallback functionality, fewer failed calls occur.

The mode switch functionality allows users to switch from multimedia to speech or from speech to multimedia during the active phase of the call. To this end, the user wishing to trigger a mode switch enters appropriate commands into his or her terminal for enabling the switch. These commands are forwarded through intermediate wireless communication networks, such as Mobile Services Switching Centers (MSCs), to the handset terminal of the other user of the call. If the mode switch is from multimedia to speech, the switch is automatically enabled without requiring any response by the remote user.

However, mostly for privacy reasons, if the switch is from a speech to multimedia, the protocol specifies that the remote user (i.e., the user receiving the request) must be permitted to first confirm the switch. That is, the remote user has the opportunity to refuse any request to switch from speech to multimedia. This prevents, for example, the receiving party of a wireless telephone call to suddenly receive unwanted images or music during what was expected to have been a pure speech call. Accordingly, the remote user is prompted to accept or decline the requested mode switch.

Within wireless communications networks employing an In-Call Modification (ICM) procedure, a timer is activated whenever a user terminal is prompted to respond to a modification to an on-going call and, if no response is received before the timer expires, the call is automatically dropped. This procedure is primarily provided to prevent calls from remaining connected indefinitely, if the terminal of the remote user is not capable of responding to the requested in-call modification. Typically, the timer (referred to herein as a "call drop timer") is typically set to thirty seconds.

Problems, however, arise when implementing SCUDIF within a network employing a call drop timer, such as ICM networks. As noted, with SCUDIF the user receiving a request for a switch between speech and multimedia is prompted to confirm the mode switch. If the user fails to respond within the thirty second period provided by the call drop timer, the call is automatically dropped by ICM (or manually disconnected before the thirty second period by the user that requested the mode switch). Circumstances may arise wherein the receiving user does not realize that he or she is obligated to respond to the mode switch request or is perhaps incapable of responding promptly for one reason or another. For example, the user may simply be taking another call via call waiting while the call subject to the mode switch request is on hold. Moreover, depending upon the implementation, the receiving user may not even be notified that a timer limit has been set and hence may simply not be aware that a deadline has been imposed. In any case, the call will be automatically disconnected after timer expiry by ICM if no response is entered, to the likely frustration of both parties to the telephone call.

Therefore, it would be highly desirable to provide wireless communications components, such as user terminals or MSCs, and methods of operating same with the capability to prevent such automatic call drops, and it is to that end that the invention is primarily directed.

SUMMARY OF THE INVENTION

In accordance with the invention, techniques are provided for use by a component of a communication network for responding to a request to switch a communication session between a speech mode and a multimedia mode, wherein the network automatically disconnects the communication session if a requested mode switch is not answered (e.g., confirmed or declined) within a predetermined period of time.

In a method implementation, the component of the communication network activates a timer upon receipt of a request (e.g., from a requesting user terminal) to switch between speech and multimedia modes, with the timer set to a duration shorter than the predetermined period of time imposed by the network. The component generates a first signal, or triggers generation of a first signal, for prompting a user (e.g., of a receiving user terminal) to respond to the request. A second signal declining the request is then automatically generated if no response to the request is received before expiration of the timer.

According to one variant of the invention, the method is performed by a first user terminal. In this case, the method may further comprise transmitting the second signal declining the request via an intermediate network component (e.g., an MSC) to a second user terminal that requested the mode switch.

According to a second variant, the method is performed by an intermediate network component such as an MSC. The intermediate network component may trigger the generation of the first signal by transmitting a third signal to a first user terminal, the third signal informing the first user terminal about the requested mode switch. Additionally, the second signal declining the request may be transmitted by the intermediate network component to a second user terminal that requested the mode switch.

The second signal automatically declining the request may only be generated if the timer was activated in response to a request to switch from speech mode to multimedia mode. Additionally, or alternatively, the second signal automatically declining the request may not be generated if the timer was activated in response to a request to switch from multimedia mode to speech mode.

The method may further comprise stopping the timer if a response to the request is received before expiration of the timer. Thus, the automatic generation of the second signal declining the request can be prevented.

According to a further aspect of the present invention, a device is provided for use by a component of a communication network in context with responding to a request to switch a communication session between a speech mode and a multimedia mode, wherein the communication session is automatically disconnected if a requested mode switch is not answered within a predetermined period of time. The device comprises a receive unit operative to receive signals, an automatic response timer, and a controller operative to activate the timer upon receipt of a request by the receive unit requesting a switch between a speech mode and a multimedia mode, with the timer being set to run for a duration shorter than the predetermined period of time, the controller further operative to generate a first signal prompting a user to respond to the request, or to trigger generation of the first signal, and to automatically generate a second signal declining the request if no response to the request is received before expiration of the timer.

According to a first variant, the component of the communication network is a user terminal also incorporating a transmit unit, and the controller is further operative to control the transmit unit to transmit the second signal declining the request to an intermediate network component (e.g., an MSC) of the communication network. According to a second variant, the component of the communication network is an intermediate network component (e.g., an MSC) also incorporating a transmit unit, and the controller is further operative to control the transmit unit to transmit the second signal declining the request to a first user terminal via the communication network.

In one specific exemplary implementation of the invention, the automatic response timer is activated by the component of the communication network regardless of whether the proposed mode switch is from speech to multimedia or vice versa. However, the second signal automatically declining the request (should no response to the request be received before expiration of the timer) is only generated if the proposed mode switch is from speech to multimedia. If the proposed switch is instead from multimedia to speech, the timer can expire without generation of the signal declining the request. This distinction is advantageous within networks that impose privacy constraints against automatically switching a call from a speech to multimedia but impose no similar constraints when switching a call from multimedia to speech.

The communication network may be, for example, a GSM or UMTS-based wireless network, incorporating 3GPP protocols including ICM/SCUDIF, but the principles invention may potentially be exploited within other communication networks as well that are configured in accordance with other standards and protocols. Although the component in which the invention is implemented is preferably a user terminal (e.g. a wireless telephone handset) or an intermediate network component, such as an MSC, the principles of the invention may potentially be exploited within other components of the communication network as well. In general, the invention may be beneficially exploited within any wireless communication network wherein the network automatically disconnects a communication session if a requested mode switch is not confirmed within a predetermined period of time.

The invention can be implemented as a hardware solution or as a computer program product comprising program code portions for performing the steps of the invention when the computer program product is run on a computing device. The computer program product may be stored on a data carrier in fixed association with or removable from the computing device.

BRIEF DESCRIPTION OF THE DRAWINGS

In the following, the invention will be described with reference to exemplary embodiments illustrated in the accompanying Figures, in which.

DETAILED DESCRIPTION OF PREFERRED EMBODIMENTS

In the following description, for the purposes of explanation and not limitation, specific details are set forth to provide a thorough understanding of the invention. It will be apparent to one skilled in the art that the invention may be practiced in other embodiments that depart from these specific details. In particular, while embodiments are described in context with a call originating from one wireless terminal and terminating at another wireless terminal, the invention is not limited to such an implementation, but for example can be utilized to set up a call originating from and/or terminating at other terminals and being transmitted via other transmission regimes. Moreover, those skilled in the art will appreciate that the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
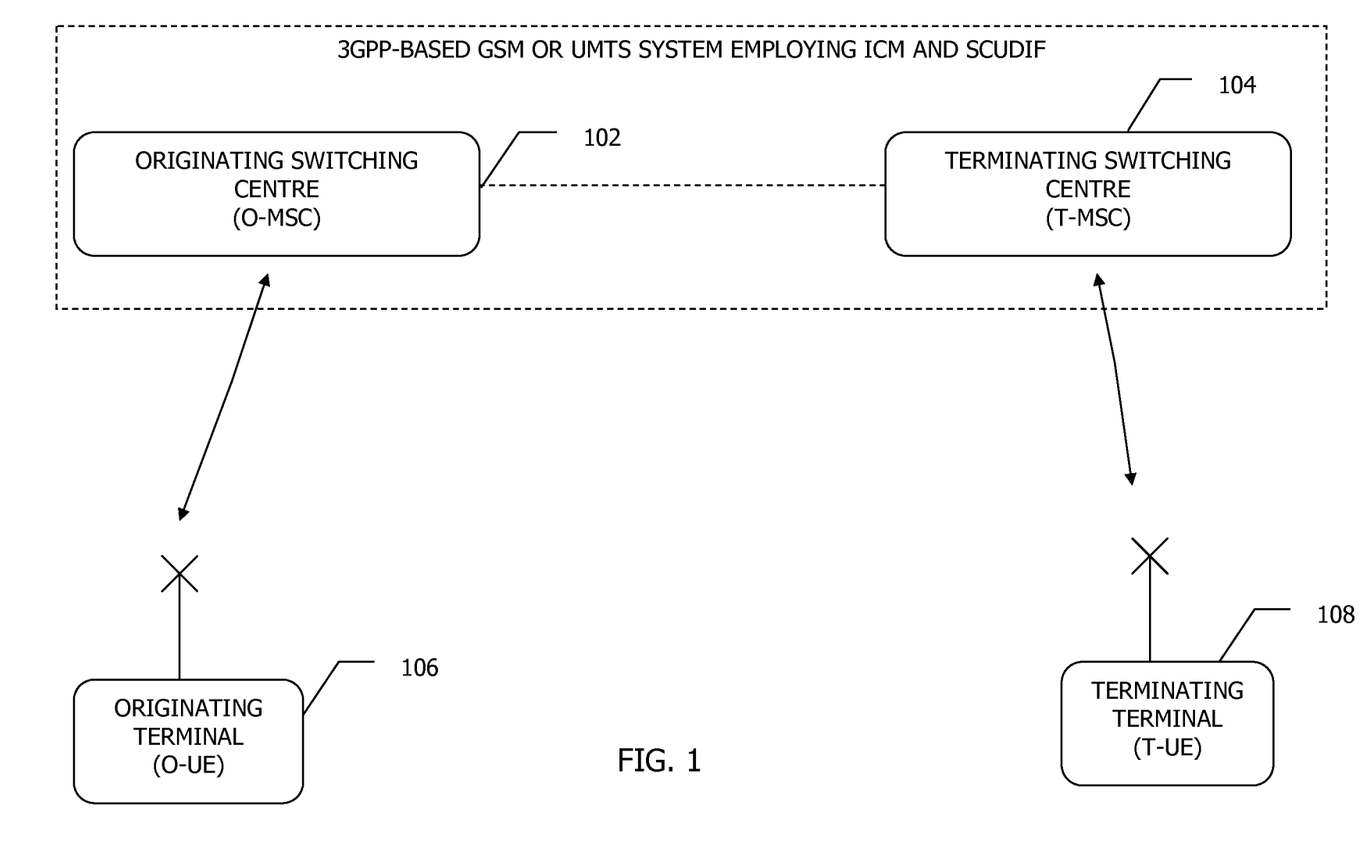
FIG. 1 provides a simplified, high-level illustration of a wireless communication network in which the invention may be implemented.

FIG. 1 provides a high level illustration of a wireless communication network 100 in which the invention may be implemented. In example of FIG. 1, the wireless communication network is a GSM or UMTS network exploiting 3GPP protocols. Although there are typically numerous components to a wireless communication network, for purposes of FIG. 1, only a pair of MSC stations are illustrated—an originating MSC (O-MSC) 102 and a terminating MSC (T-MSC) 104. The O-MSC 102 is associated with a terminal 106 of user originating a wireless telephone call (with terminal 106 also referred to herein as the originating user equipment (O-UE)). The T-MSC 104 is associated with a terminal 108 of a user receiving the call (with terminal 108 also referred to herein as the terminating user equipment (T-UE)).

Wireless communication network 100 is configured to employ ICM and SCUDIF functionalities (or similar functionality), which are implemented within the MSCs 102, 104 and/or within the terminals 106, 108. As noted above, ICM provides a thirty-second timer during a request to change the parameters of a call during the active phase of the call. If no response is received, the call is automatically dropped (or disconnected). The ICM timer can be implemented by the O-UE 106 or by the T-MSC 104. It may, alternatively, be implemented by the O-MSC 102 or the T-UE 108.

The thirty-second timer provided by ICM is generally referred to herein also as a call drop timer. Within one specific implementation of ICM, a timer referred to as the T323 is used for this purpose. On the other hand, SCUDIF allows a user (such as the user of terminal 106) to request a mode switch between speech and multimedia during the active phase of the telephone call with another user (such as the user of terminal 108) but imposes a privacy constraint whereby the user receiving the request to switch from speech to multimedia must first agree to the request before the mode switch can be completed. As already explained, circumstances may arise wherein the call drop timer of ICM may expire before a response is entered by the user, resulting in an automatic disconnection of the telephone call.

Figure 2:
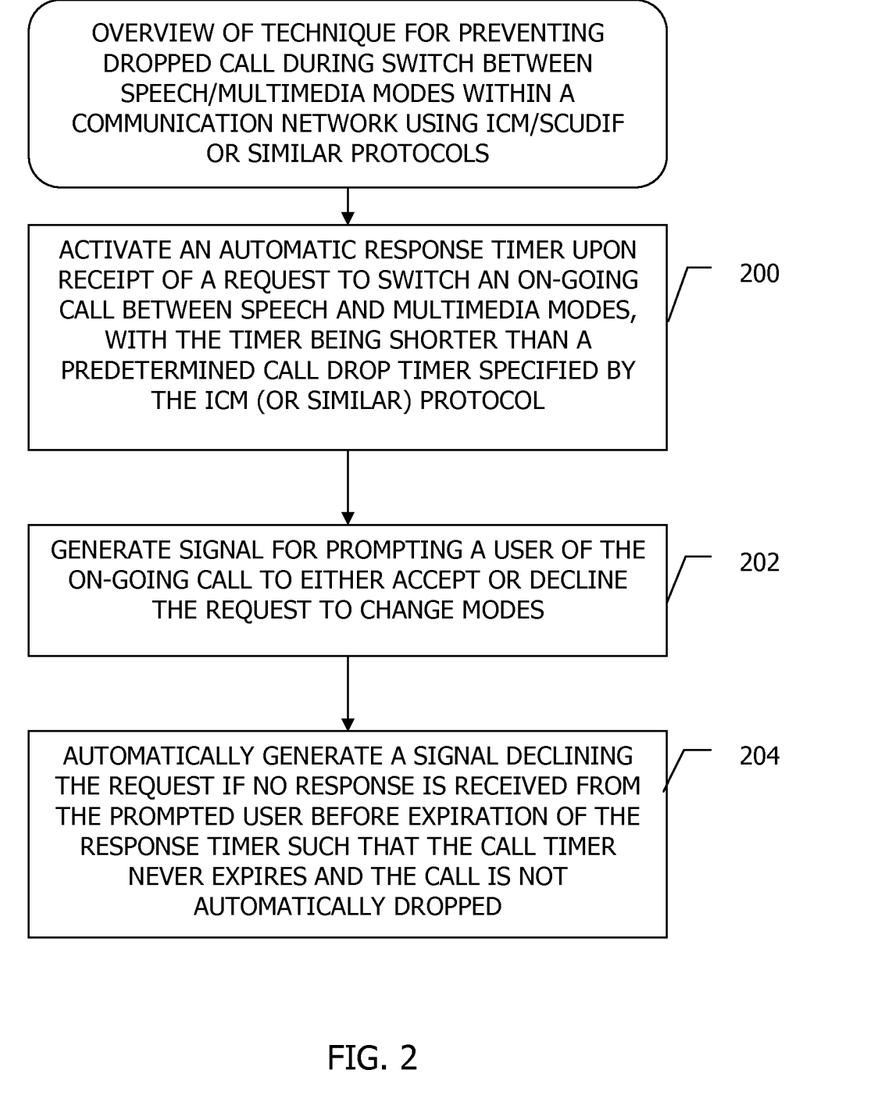
FIG. 2 summarizes steps performed by a component of the network of FIG. 1, wherein an automatic response timer is employed for use in preventing dropped calls during speech/multimedia mode switches.

FIG. 2 provides a flowchart presenting an overview of one embodiment of a method for solving this problem in accordance with the present invention. The method may be implemented by a component of the wireless communication network of FIG. 1, such as by a user terminal 106, 108 and/or by an MSC 102, 104. Individual examples involving user terminals 106, 108 and MSCs 102, 104 will be described below with reference to FIGS. 3 to 6 in more detail. FIG. 2 is merely intended to generally set forth the technique.

Briefly, beginning with 200, the component activates an automatic response timer upon receipt of a request from user terminal to switch an ongoing call between speech and multimedia modes. The timer, referred to herein as an automatic response timer, is set shorter than the duration of the call drop timer specified by the ICM protocol. At step 202, the component generates a signal for prompting the user that receives the request to change modes to either accept or decline the request. Alternatively, at step 202, the component triggers the generation of a signal for prompting the user to answer the requested mode switch (e.g., by transmitting a triggering signal to a further component that generates the prompting signal).

At step 204, the component automatically generates a signal declining the request if no response is received from the prompted user before expiration of the automatic response timer. In an example in which the component implementing the steps of FIG. 2 is the user terminal, the automatically generated signal declining the request is then transmitted to the associated MSC, which responds thereto by deactivating the call drop timer of ICM. In an example in which the component implementing the steps of FIG. 2 is the MSC itself, the signal declining the request is merely forwarded to ICM components of the MSC, which responds thereto by deactivating its call drop timer. In either case, the automatic call drop timer of ICM is thereby not allowed to expire. Accordingly, the call is not automatically dropped due to any failure by the user receiving the request to respond to the request within a timely manner.

Insofar as the duration of the automatic response timer set at step 200 is concerned, ideally the timer is set to a value as large as possible to allow the user as much time as possible to respond the prompt while still ensuring that the automatic response will be generated and processed in a time to prevent an automatic call drop. The optimal value for the timer depends upon the particular network in which the technique is implemented as well as, of course, the duration of the call drop timer employed by network. For a typical GSM or UMTS wireless network employing a thirty-second call drop timer, a value in the range of 15 to 20 seconds is sufficient to ensure that the signal declining the request generated at step 204 will be processed in time to deactivate the call drop timer, while still allowing the user sufficient time to decide whether to accept or decline the mode switch request. Routine experimentation may be performed within other communication networks to determine optimal values for the automatic response timer. Note though that an optimal value for the timer need not be employed. Rather, it is sufficient that the timer be set to any value sufficiently shorter in duration than the call drop timer to permit an automatic response to be generated and processed so as to prevent the automatic call drop. Accordingly, smaller timer values, such as values in the range of 5 to 10 seconds, potentially could be employed.

Figure 3:
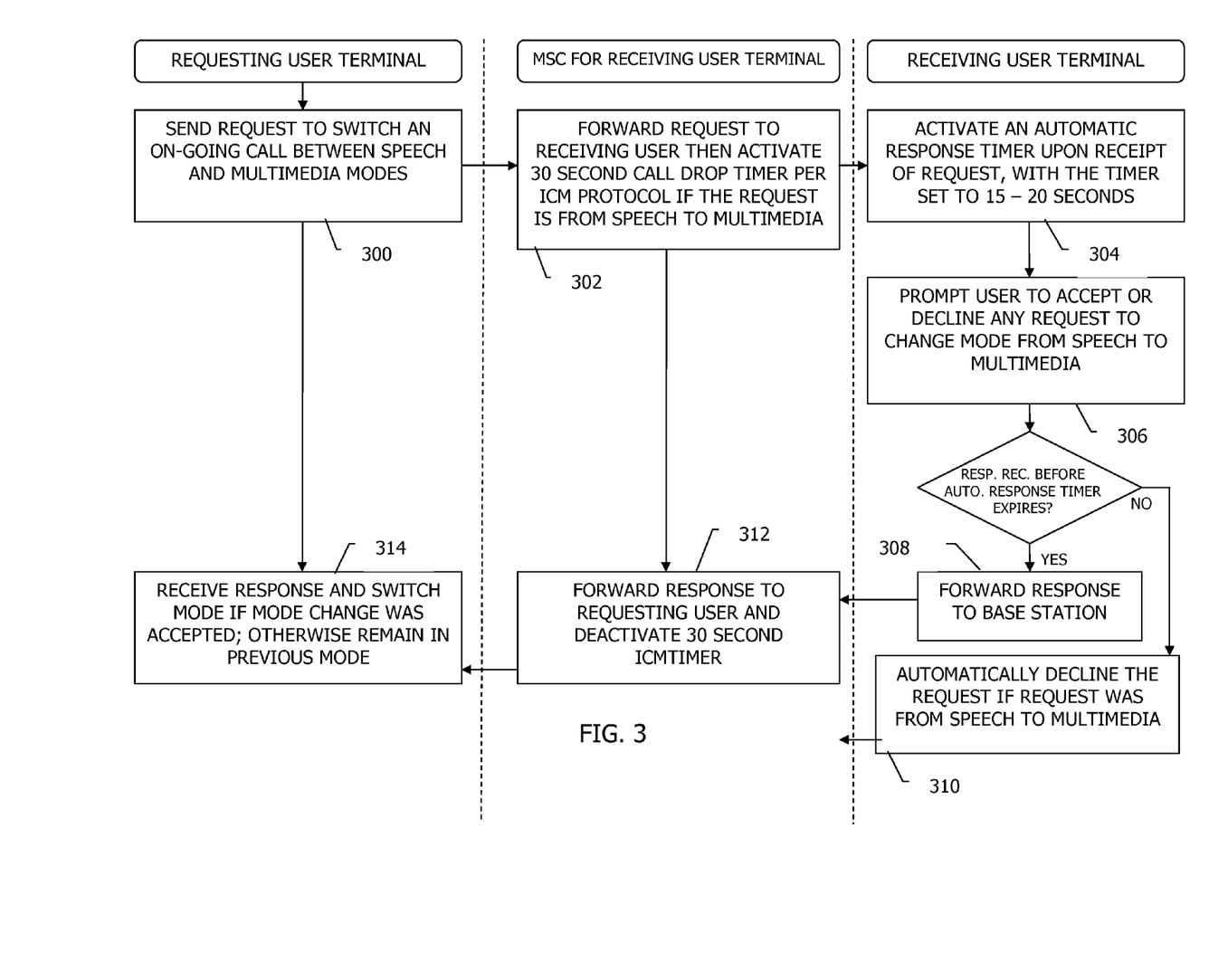
FIG. 3 illustrates steps performed by various components of the network of FIG. 1 for an implementation in which the user terminal of the user receiving a request for a mode switch activates the automatic response timer to prevent dropped calls.
Figure 4:
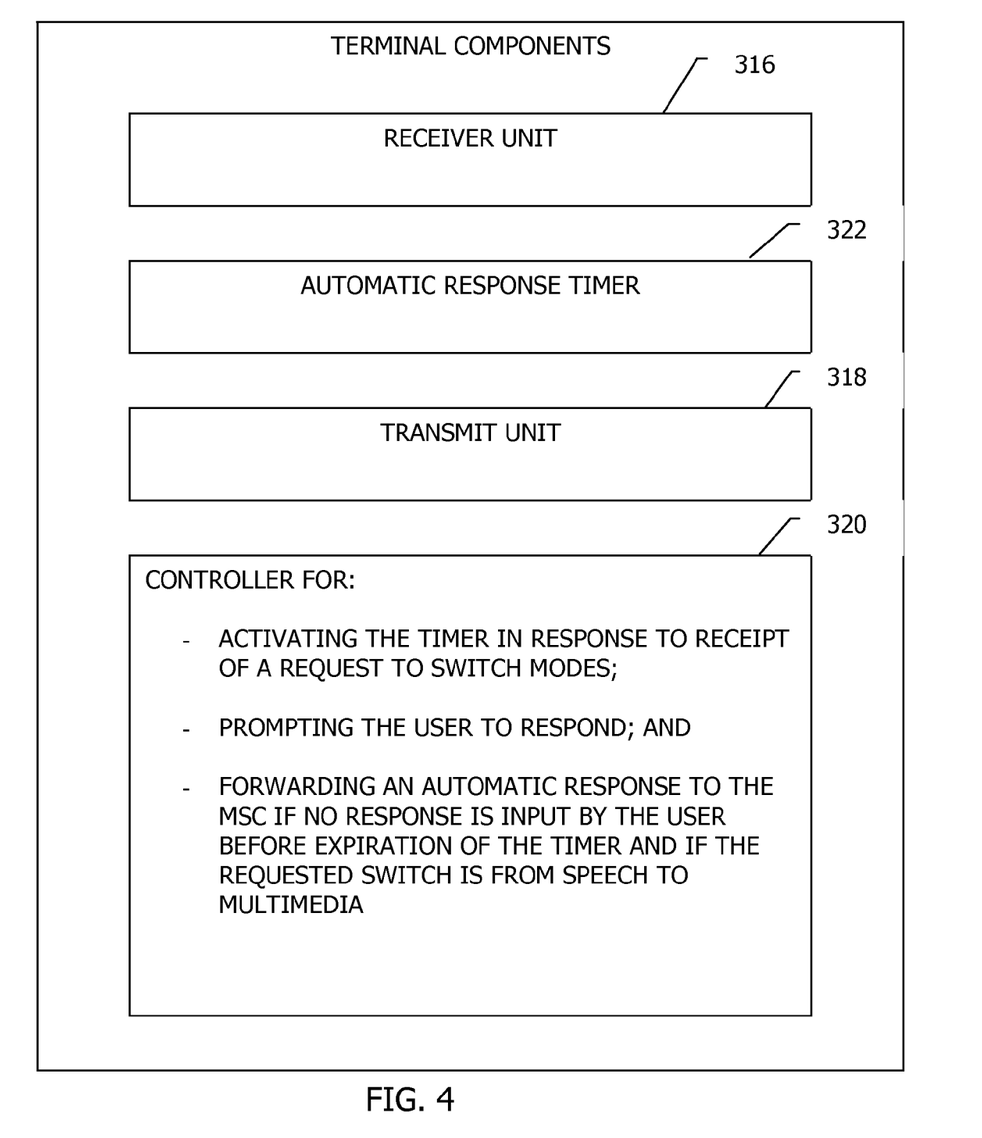
FIG. 4 illustrates selected components of a user terminal of the network of FIG. 1 for implementing the method of FIG. 3.

Turning now to FIGS. 3 to 4, an example is described according to which the general steps of FIG. 2 are implemented within a user terminal. This is one of the preferred implementations.

FIG. 3 illustrates method steps performed by selected components of the wireless network, whereas FIG. 4 illustrates an individual device for use within the user terminal. Within FIGS. 3 and 4, and within all Figs. described herein, only pertinent components and steps are illustrated and described. As can be appreciated by those skilled in art, numerous additional steps and components are required to process wireless communications. Only those components and steps pertinent to the invention are described herein for the sake of clarity in describing the invention.

Within FIG. 3, steps performed by the user terminal requesting the mode switch are shown on the left; steps performed by the user terminal receiving the request are shown on the right; and the steps performed by the MSC associated with the receiving terminal are shown in the middle. Note that the requesting user terminal may be either an O-UE or a T-UE, i.e. either party can request a mode switch. Accordingly, for both clarity and generality, the user terminal requesting the mode switch is referred to herein as the "requesting user terminal" and the user terminal receiving the request is referred to herein as the "receiving user terminal".

Beginning at step 300, the requesting user terminal sends a request to switch the speech/multimedia mode of an ongoing call via a wireless network connection to the MSC associated with the other party of the telephone call (i.e. the O-MSC if the receiving user is the O-UE or the T-MSC if the receiving user is the T-UE).

The request is received by the appropriate MSC, at step 302, which forwards the request to the receiving user terminal and also activates the thirty-second call drop timer of the ICM protocol if the request is for a switch from speech to multimedia. If the request is for a switch from multimedia speech, the thirty-second call drop timer is not activated since no response will be required from the receiving user. As already noted, for privacy reasons, the receiving user must be given an opportunity to accept or decline a switch from speech to multimedia but no such requirement is (usually) imposed for a switch from multimedia to speech. Accordingly, the MSC simply forwards any request to switch from multimedia to speech directly to the receiving user terminal, at step 302.

At step 304, the receiving user terminal receives the mode switch request (in the form of, e.g., a MODIFY DTAP/RNAP_NAS message) and activates the automatic response timer which, as noted, is typically set in the range of 15 to 20 seconds. Note that in the present embodiment, unlike the call drop timer of the MSC, the automatic response timer of the receiving user terminal is activated regardless of whether the requesting switch is from speech to multimedia or vice versa.

At step 306, the user terminal generates a signal to prompt the receiving user to either accept or decline the request to change mode if the request is from speech to multimedia. To prompt the user, a suitable graphic display may be generated on the user's handset informing the user of the requested mode switch, and a suitable notification sound may be generated dependent upon user settings.

If a response to the prompt is input by the user before the automatic response timer expires then, at step 308, the user response is simply forwarded to the MSC (in the form of, e.g., a MODIFY COMPLETE DTAP/RNAP_NAS message if the request is accepted or in the form of, e.g., a MODIFY REJECT DTAP/RNAP_NAS message if the request is declined). If, however, no response is input by the user before the automatic response timer expires and the request had been to switch from speech to multimedia, then step 310 is instead performed wherein the user terminal generates and transmits a signal automatically declining the request back to the MSC (in the form of, e.g., a MODIFY REJECT DTAP/RNAP_NAS message since the request is declined).

The MSC then forwards the response, at step 312, to the requesting user terminal and deactivates the thirty-second call drop timer. Finally, the requesting user receives the response, at step 314, and switches the speech/multimedia mode if the mode switch was accepted. Otherwise, the requesting user terminal simply remains in its previous mode of operation.

Note that, if the request had been to switch from multimedia to speech, then the expiration of the automatic response timer at step 310 is simply ignored since no response is required in that circumstance. Instead, the user terminal simply resets its internal mode to speech in expectation of receiving speech signals from the other user via the MSC. The automatic response timer is set, at step 304, for both types of mode switches (i.e. speech to multimedia and multimedia to speech) to account for the possibility that the implementation standards may change so as to require the receiving user to confirm a multimedia to speech switch as well as a speech to multimedia switch. By configuring the hardware of the user terminal to activate the timer in both situations, any such changes in standards are more easily accommodated. Of course, different configurations (and in particular a conditional timer activation) may be implemented if required.

FIG. 4 illustrates, at a high level, individual units within an exemplary user terminal for use in implementing steps 304 to 310 of FIG. 3. These units will only briefly be summarized as the steps they perform have already been described. A receiving unit 316 receives signals from the MSC and a transmit unit 318 transmits signals to the MSC, all under the control of a controller 320. The controller 320 also controls the activation of an automatic response timer 322 upon receipt of a request to switch modes; prompts the user to respond to the request via a suitable input/output device (not shown); and forwards an automatic response to the MSC if no response is input by the user before expiration of the timer (so long as the requested switch is from a speech to multimedia).

Figure 5:
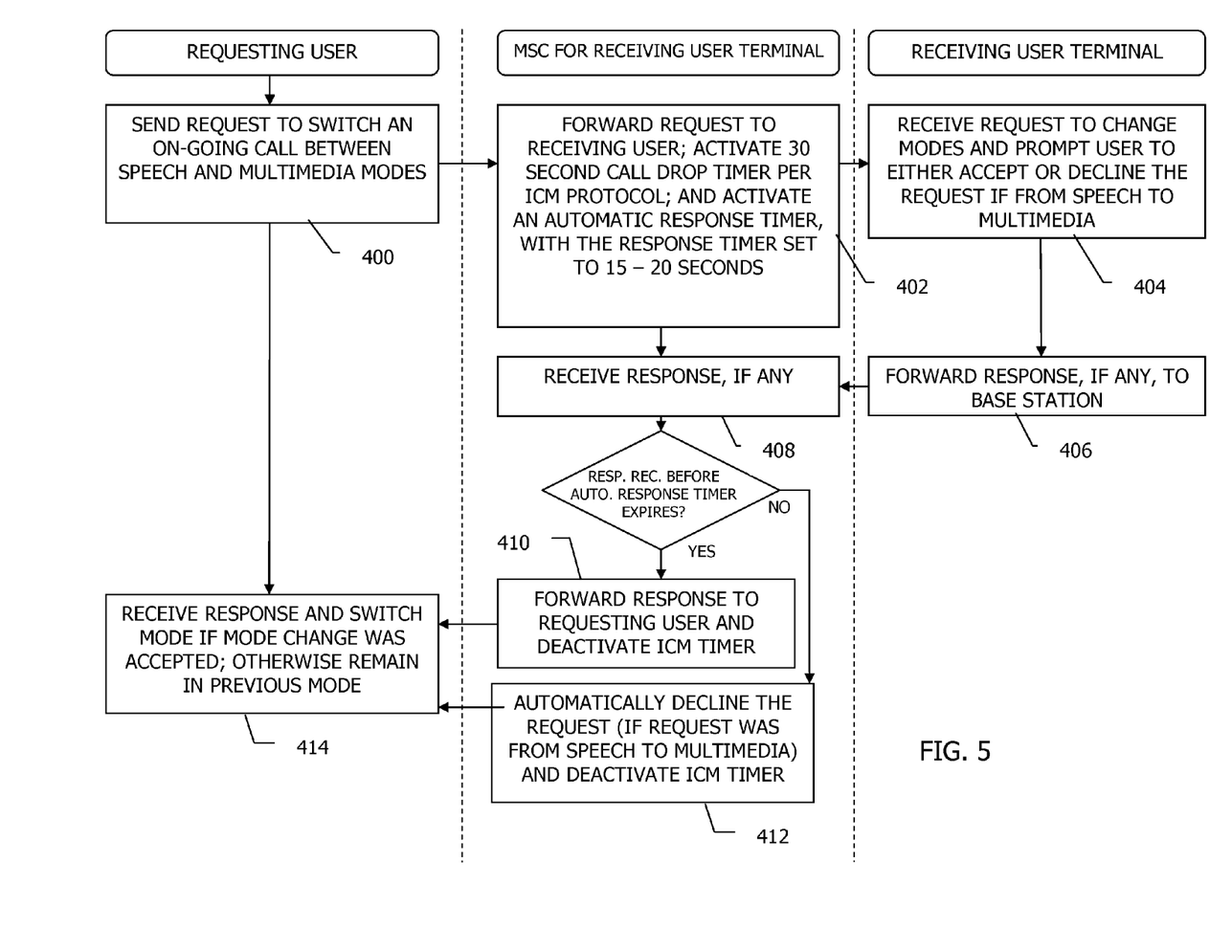
FIG. 5 illustrates steps performed by various components of the network of FIG. 1 for an implementation in which an intermediate network component activates the automatic response timer to prevent dropped calls.
Figure 6:
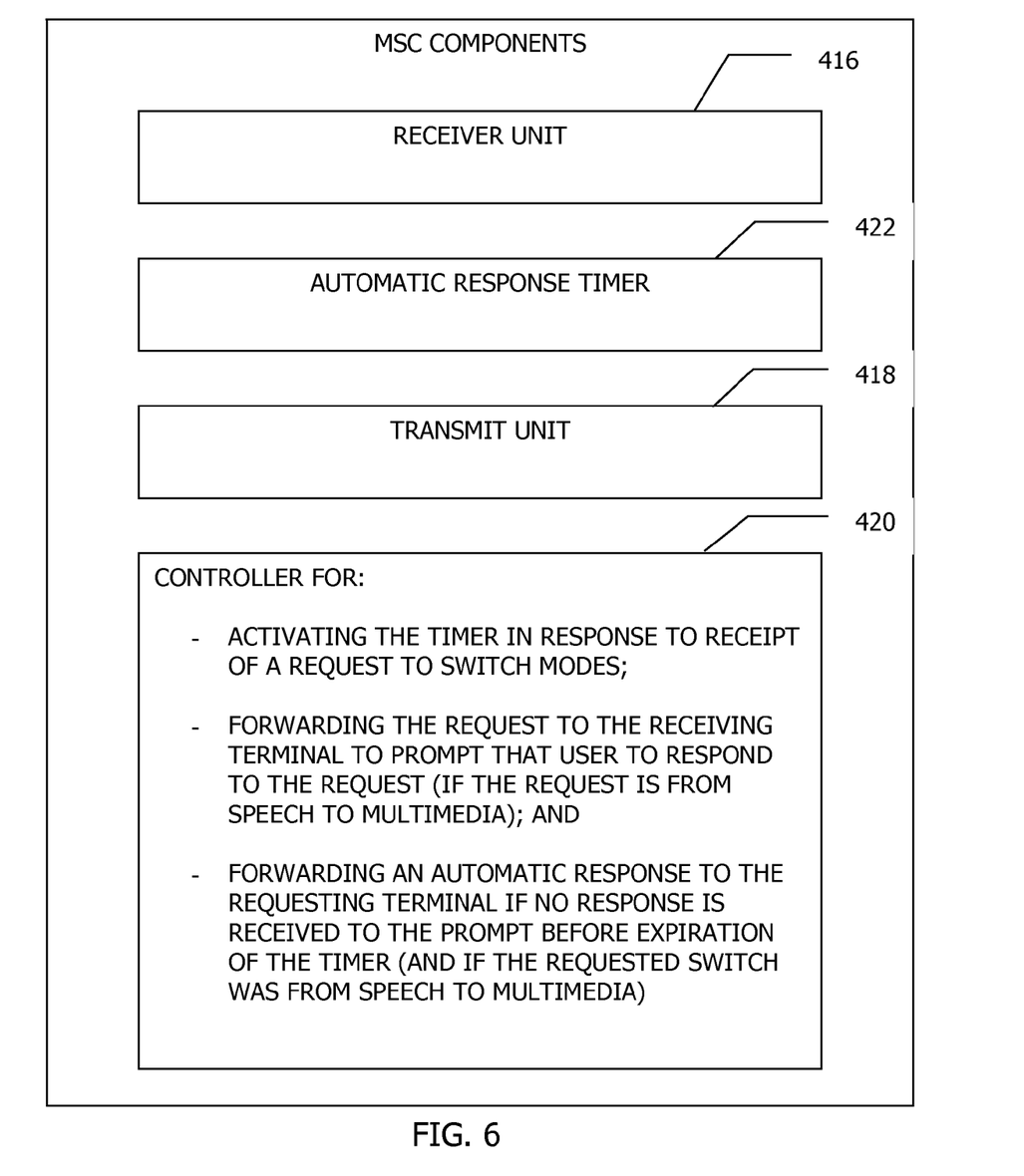
FIG. 6 illustrates selected components of an intermediate network component of the network of FIG. 1 for implementing the method of FIG. 5.

Turning now to FIGS. 5 to 6, an example is described in which the general steps of FIG. 2 are implemented within an MSC. FIG. 5 illustrates the method steps, whereas FIG. 4 illustrates pertinent individual units for use within the MSC. As many of the steps and components are similar or identical to those already described in connection with FIGS. 3 to 4, only pertinent differences will be discussed in detail.

Briefly, beginning at step 400 of FIG. 5, the requesting user terminal sends a request to switch the speech/multimedia mode of an ongoing call, which is received by the appropriate MSC, at step 402. The MSC forwards the request to the receiving user and, as already explained, activates the thirty-second call drop timer if the request is for a switch from speech to multimedia. Additionally, though, the MSC also activates the shorter internal automatic response timer, separate from the ICM timer. The automatic response timer is activated regardless of whether the request is for a speech to multimedia switch or vice versa. As before, if the request is for a switch from multimedia to speech, the thirty-second call drop timer is not activated since no response will be required from the receiving user.

Forwarding the mode switch request by the MSC to the receiving terminal triggers a user prompting procedure within the receiving terminal. More specifically, at step 404, the receiving terminal receives the mode switch request and prompts the user to either accept or decline the request, if the request is from speech to multimedia.

Otherwise, the receiving user terminal simply resets its internal mode to speech in expectation of receiving speech signals from the other user via the MSC. At step 406, the user's response, if any, is forwarded to the MSC and received at step 408.

If a response to a speech to multimedia switch is received by the MSC at step 408 before the automatic response timer expires, then the response is simply processed in accordance with otherwise conventional techniques, including deactivation of the ICM timer and forwarding of the response to the requesting user at step 410. If, however, no response is received from the receiving user terminal before the automatic response timer expires (and the request had been to switch from speech to multimedia), then step 412 is instead performed wherein the MSC automatically (e.g., without receiving a corresponding user command) generates and transmits signals declining the request to the requesting user terminal and deactivates the ICM timer. In either case, the thirty-second ICM timer is deactivated before it can expire and trigger a call drop. Finally, the requesting user receives the response, at step 414, and switches the speech/multimedia mode if the mode switch was accepted. Otherwise, the requesting user terminal simply remains in its previous mode of operation.

Turning now to FIG. 6, individual units within an MSC for use in implementing steps 402 and 408 to 412 of FIG. 5 will briefly be summarized. A receiver unit 416 selectively receives signals from both the requesting user terminal and the receiving user terminal and a transmit unit 418 selectively transmits signals to both terminal, all under the control of a controller 420. The controller also controls the activation of an automatic response timer 422 upon receipt of a request to switch modes; forwards the request to the receiving user terminal to prompt the user to respond to the request; and also forwards an automatic response to the requesting user terminal if no response is received from the receiving user before expiration of the timer (so long as the requested switch is from a speech to multimedia).

Thus, various examples have been set forth for use within wireless communications networks employing ICM/SCUDIF functionalities pursuant to 3GPP standards. More information pertaining to applicable portions of the 3GPP standards may be found in 3GPP TS 24.008 V6.5, Chapter 5.3.4.3 "Changing the Call Mode", Mobile Radio Interface Layer 3 specification, Core Network Protocols; 3GPP TS 23.172 V6.0, "Technical Realisation of Circuit Switched (CS) Multimedia Service, UDI/RDI Fallback is and Service Modification, Stage 2"; and in 3GPP TS 26.111 V5.1, "Codec for Circuit Switched Multimedia Service, Modifications to H.324".

In the above embodiments, a call is not automatically disconnected merely due to a lack of response from the user receiving the mode switch request. Instead, the request is automatically refused, allowing the telephone call to continue is its previous mode. One benefit of the present invention resides in the fact that the unintentional dropping or disconnecting of calls can be avoided. The inventive approach is particularly beneficial to users that are prevented from responding to a mode switch request or that do not realise that a mode switch request has been offered.

While the invention has been described with respect to particular embodiments, those skilled in the art will recognize that the invention is not limited to the specific embodiments described and illustrated herein. Therefore, while the invention has been described in relation to exemplary embodiments, it is to be understood that this disclosure is only illustrative. Accordingly, it is intended that the invention be limited only by the scope of the claims appended hereto.

The invention claimed is:

1. A method performed by a component of a communication network in a communication session between a speech mode and a multimedia mode, wherein the communication session is automatically disconnected if a requested mode switch is not answered within a predetermined period of time, the method comprising:
   activating a timer upon receipt of a request that the component switch from a speech mode to a multimedia mode, the timer being shorter in duration than a predetermined period of time provided by a call drop timer in the communication network;
   generating a first signal for prompting a user to respond to the request, or triggering generation of such a first signal; and
   automatically generating a second signal declining the request if no response to the request is received before expiration of the timer.

2. The method of claim 1, wherein the component is a first user terminal.

3. The method of claim 2, further comprising transmitting the second signal declining the request via an intermediate network component to a second user terminal that requested the mode switch.

4. The method of claim 3, wherein the intermediate network component is a mobile services switching centre (MSC).

5. The method of claim 1, wherein the component is an intermediate network component.

6. The method of claim 5, wherein the intermediate network component triggers the generation of the first signal by transmitting a third signal to a first user terminal, the third signal informing the first user terminal about the requested mode switch.

7. The method of claim 5, further comprising transmitting the second signal declining the request to a second user terminal that requested the mode switch.

8. The method of claim 1, wherein the second signal automatically declining the request is only generated if the timer was activated in response to a request to switch from speech mode to multimedia mode.

9. The method of claim 1, wherein the second signal automatically declining the request is not generated if the timer was activated in response to a request to switch from multimedia mode to speech mode.

10. The method of claim 1, further comprising stopping the timer if a response to the request is received before expiration of the timer.

11. The method of claim 1, wherein the network incorporates components exploiting "Service Change and Unrestricted Digital Interface (UDI) Fallback" (SCUDIF) functionality.

12. A computer program product comprising program code portions stored on a non-transitory computer-readable recording medium which when executed on one or more computing devices, performs the acts of claim 1.

13. A device for use as a component of a communication network, the device comprising:
   a receive unit configured to receive signals;
   a timer; and
   a controller configured to:
      i. activate the timer upon receipt of a request at the receive unit requesting that the device switch from a speech mode to a multimedia mode, the timer being set to run for a duration shorter than a predetermined period of time provided by a drop call timer in the communication network;
      ii. generate a first signal prompting a user to respond to the request, or to trigger generation of such a first signal; and
      iii. automatically generate a second signal declining the request if no response to the request is received before expiration of the timer.

14. The device of claim 13, wherein the device is a user terminal comprising a transmit unit, and wherein the controller is further configured to control the transmit unit to transmit the second signal declining the request to an intermediate network component of the communication network.

15. The device of claim 14, wherein the intermediate network component is a mobile services switching centre (MSC).

16. The device of claim 13, wherein the component is an intermediate network component comprising a transmit unit, and wherein the controller is further operative to control the transmit unit to transmit the second signal declining the request to a first user terminal via the communication network.

17. The device of claim 13, wherein the communications network is configured at least substantially in accordance with a Universal Mobile Telecommunications System (UMTS) standard.

18. The device of claim 13, wherein the communications network is configured at least substantially in accordance with a Global System for Mobile Communications (GSM) standard.

19. The device of claim 13, wherein the network incorporates components exploiting "Service Change and Unrestricted Digital Interface (UDI) Fallback" (SCUDIF) functionality.

* * * * *

UNITED STATES PATENT AND TRADEMARK OFFICE
CERTIFICATE OF CORRECTION

| | | |
|---|---|---|
| PATENT NO. | : 9,066,215 B2 | Page 1 of 1 |
| APPLICATION NO. | : 13/862573 | |
| DATED | : June 23, 2015 | |
| INVENTOR(S) | : Veron et al. | |

It is certified that error appears in the above-identified patent and that said Letters Patent is hereby corrected as shown below:

ON THE TITLE PAGE

Item (12), under "United States Patent", in Column 1, Line 1, delete "Vernon" and insert -- Veron --, Item (72), under "Inventors", in Column 1, Line 1, delete "Vernon," and insert -- Veron, --, Item (56), under "FOREIGN PATENT DOCUMENTS", in Column 2, Line 1, delete "JP 08-130586 A 5/1996", Item (56), under "FOREIGN PATENT DOCUMENTS", in Column 2, Line 3, insert -- WO 01/76288 A1 10/2001 --.

IN THE SPECIFICATION

In Column 1, Line 6, delete "Jul. 23, 2007," and insert -- Aug. 14, 2007, now Pat. No. 8,422,998, --, In Column 1, Line 19, delete "State-of-art" and insert -- State-of-the-art --,

In Column 1, Lines 40-45, delete "Unrestricted.......................call." and insert the same at Line 39, after "and", as a continuation paragraph.

In Column 9, Line 16, delete "is and" and insert -- and --.

IN THE CLAIMS

In Column 10, Line 27, in Claim 12, delete "which when" and insert -- which, when --.

Signed and Sealed this
Twenty-third Day of February, 2016

Michelle K. Lee
*Director of the United States Patent and Trademark Office*